United States Patent [19]
Yamamoto et al.

[11] Patent Number: 5,661,780
[45] Date of Patent: Aug. 26, 1997

[54] CORDLESS TELEPHONE HAVING POWER FAILURE DETECTION CIRCUIT

[75] Inventors: Munekatsu Yamamoto; Masaru Akiyama; Kazuo Maeda, all of Chiba-ken, Japan

[73] Assignee: Uniden Corporation, Chiba-ken, Japan

[21] Appl. No.: 561,253

[22] Filed: Nov. 21, 1995

[30] Foreign Application Priority Data

Jul. 12, 1995 [JP] Japan ................... 7-175718

[51] Int. Cl.$^6$ ................................................ H04Q 7/00
[52] U.S. Cl. ................................................ 379/61
[58] Field of Search ................................................ 379/61

[56] References Cited

U.S. PATENT DOCUMENTS

| | | |
|---|---|---|
| 4,075,510 | 2/1978 | Pascente . |
| 4,761,722 | 8/1988 | Pruitt . |
| 4,894,856 | 1/1990 | Nakanishi et al. ........... 379/61 |

FOREIGN PATENT DOCUMENTS

| | | |
|---|---|---|
| 3-71758 | 3/1991 | Japan . |
| 3-212129 | 9/1991 | Japan . |

OTHER PUBLICATIONS

Abstract of JP 2-23753, Masahiro Fukuda, "Cordless Telephone System", Jan. 25, 1990.
Abstract of JP 1-177748, Hiroshi Furumura, "Cordless Telephone Set", Jul. 14, 1989.
Abstract of JP 3-85847, Keiichiro Sumikawa, "Cordless Telephone Set", Apr. 11, 1991.
Abstract of JP 3-60556, Keiichiro Sumikawa, "Cordless Telephone Set", Mar. 15, 1991.
Abstract of JP 4-167849, Takashi Ui, "Cordless Telephone Set", Jun. 15, 1992.
Abstract of JP 3-160843, Isamu Matsuda, "Cordless Telephone System", Jul. 10, 1991.

*Primary Examiner*—William Cumming
*Attorney, Agent, or Firm*—Fish & Richardson PC

[57] ABSTRACT

A cordless telephone can include a base unit including a cordless telephone circuit, a power source circuit and a resistor connected between a pair of power output terminals of the power source circuit, and a handset unit including a cordless telephone circuit, a secondary battery, a circuit connected between a charging terminal which receives power supply output from the power source circuit and a terminal of the secondary battery and consisting of a diode and a resistor connected in parallel to each other and a power break detection circuit. The secondary battery is usually charged by power supply from the power source circuit via the charging terminal and diode when the handset unit is placed in a cradle of the base unit, and electric power is supplied from the secondary battery to the cordless telephone circuit in the handset unit to operate in intermittent reception mode. When a break in power occurs at the base unit, the voltage at the charging terminal is dropped to a voltage level obtained by dividing the charged voltage at the secondary battery with two resistances which is lower than a reference voltage. Accordingly, the power break detection circuit outputs a power break detection signal having a low logic level to enter the handset unit in sleep mode.

8 Claims, 3 Drawing Sheets

CORDLESS TELEPHONE HAVING POWER FAILURE DETECTION CIRCUIT

BACKGROUND OF THE INVENTION

1. Field of the Invention

The present invention relates to a cordless telephone, and more particularly to a cordless telephone comprised of a base unit including a power source circuit and a handset unit including a secondary battery which is charged by means of power supplied by the power source circuit and a power failure detection circuit for detecting a break in power at the power source circuit to thereby enable the handset unit to be changed to sleep mode, thus conserving power at the handset unit.

2. Description of Prior Arts

As shown in FIG. 1, a conventional cordless telephone is comprised of a base unit 1 and a handset unit 2 wherein a secondary battery 21 contained in the handset unit 2 is charged by means of a power source circuit 11 contained in the base unit 1 with electric power being supplied to a cordless telephone circuit 22 of the handset unit 2 from the secondary battery 21. It is to be noted that the numeral 12 designates a cordless telephone circuit of the base unit 1 which transmits and receives signals to and from the cordless telephone circuit 22 of the handset unit 2 in a wireless manner.

In the above-mentioned conventional cordless telephone, if a power failure occurs at the power source circuit 11 of the base unit, power residing in the secondary battery 21 is consumed at the handset unit when the cordless telephone circuit 22 is in an intermittent receipt operation, despite the fact that the secondary battery 21 does not receive power from the power source circuit 11 of the base unit 1. Accordingly, if break in power lasts for a long period of time, the charge in the secondary battery 21 is depleted, with the result that the telephone cannot be used. This may causes serious inconvenience particularly in an office or the like. That is, if a main power switch in an office is turned-off upon office workers leaving the office and the main power switch is turned-on the next morning for instance, the telephone cannot be used until the battery has recharged. That is, the telephone cannot be used immediately after the turn-on of the main power switch, accordingly, during this unserviceable period of time, some business may be interrupted and put to an inconvenience.

Accordingly, it is desirable to reduce power consumption in a secondary battery provided in a handset unit when power supply to a base unit is interrupted.

Conventionally, the following method has been employed to detect a break in power in a power source circuit in a base unit with a view to reducing power consumption of a secondary battery in a handset unit.

(1) A mechanical switch is provided which detects whether or not the handset unit is placed in a cradle of the base unit, and a voltage detection circuit is provided which detects whether or not a voltage at a charging terminal of issued the handset unit for charging a secondary battery of the handset unit from a power source circuit of the base unit is lower than a predetermined level. When the mechanical switch detects that the handset unit is placed in the cradle and the voltage detection circuit detects that the voltage at the charging terminal is below the predetermined level, a power supply switch connecting the secondary battery to a reception circuit of the handset unit will be turned-off to cut power supply to the reception circuit. Such a method and apparatus as mentioned above are disclosed in Japanese Patent Laid-Open Publication No. 3-212129 issued on 1991.

(2) A voltage detection circuit is provided which detects a charge in a secondary battery of a handset unit and a voltage divider circuit is provided which divides the output voltage of the voltage detection circuit and outputs the divided voltage only when a break in power at a power source circuit of a base unit occurs under the condition that the handset unit is placed on a cradle of the base unit. When a break in power at the base unit is detected on the basis of the divided voltage, a switch inserted between the secondary battery and a load circuit will be turned off so as to shut down supply of power to the load circuit. Such a method and apparatus as mentioned above are disclosed in Japanese Patent Laid-Open Publication No. 3-71758 issued in 1991.

According to the prior example (1), it is necessary to provide a mechanical switch for detecting if a handset unit is placed in the cradle. Accordingly, since it is necessary to provide not only two pair of charging terminals for charging the secondary battery from the base unit but also the mechanical switch, it makes a constitution of a cordless telephone complex.

According to the prior example (2), when a break in power at a power source circuit of a base unit is detected, power will not be supplied to the entire load circuit in a handset unit, and as a result information previously stored in a memory of the handset unit will be lost.

SUMMARY OF THE INVENTION

In order to solve problems of prior arts as above mentioned, a cordless telephone according to the present invention comprising; (a) a resistor means connected between a pair of power output terminals of said power source circuit of said handset unit; (b) a circuit incorporated in said handset unit and connected between a charging terminal which receives a power supply output from said power source circuit and a terminal of said secondary battery, said circuit comprising a rectifier element and a resistor means connected in parallel to each other; (c) a power break detection circuit incorporated in said handset unit, comprising a first voltage comparator for comparing a voltage at said charging terminal with a first reference voltage, and said power break detection circuit providing a power break detection signal when the former voltage is lower than the latter voltage; and (d) a control circuit for controlling said handset unit to be in sleep mode, in response to said power break detection signal from said power break detection circuit.

In an embodiment of the present invention, instead of the voltage comparator in the power break detection circuit, current direction detection means for detecting a direction of current flowing between the charging terminal and said terminal of the secondary battery, and the power failure detection circuit provides a power break detection signal when the current flows from the second battery to the charging terminal.

In another embodiment of the present invention, the power break detection circuit further comprises a timer circuit connected to receive the output of said voltage comparator, and the timer circuit clocks during when the voltage at the charging terminal is lower than the first reference voltage, and provides a time-over signal as the power break detection signal when it continuously clocks for a predetermined time period.

In a further embodiment of the present invention, the handset unit further includes a second voltage comparator for comparing the voltage at the charging terminal with a second reference voltage which is larger than the first reference voltage, and for providing a signal to the control circuit when the former voltage is lower than the latter voltage, whereby the signal from the second comparator representing that the secondary battery is not being charged by the power source circuit of the base unit.

DESCRIPTION OF THE PREFERRED EMBODIMENTS

Figure 1A:
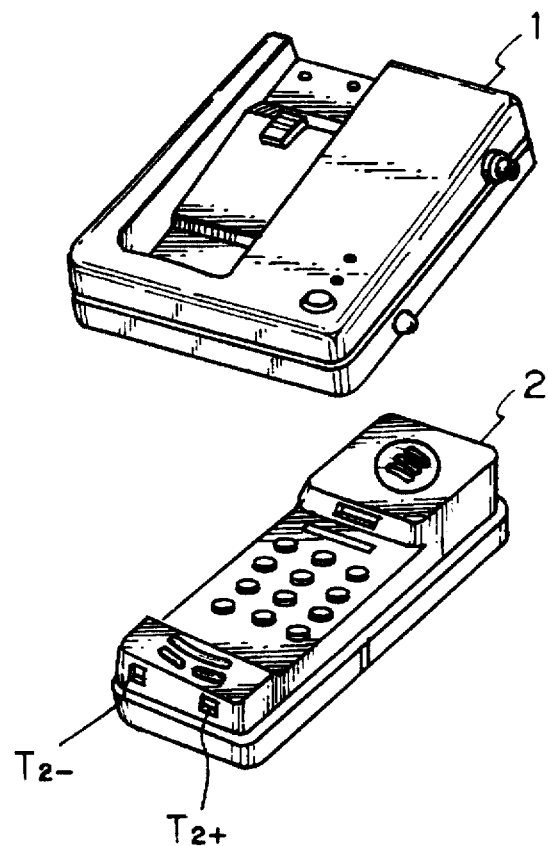
FIG. 1(A) is a perspective view of a conventional cordless telephone.
Figure 1B:
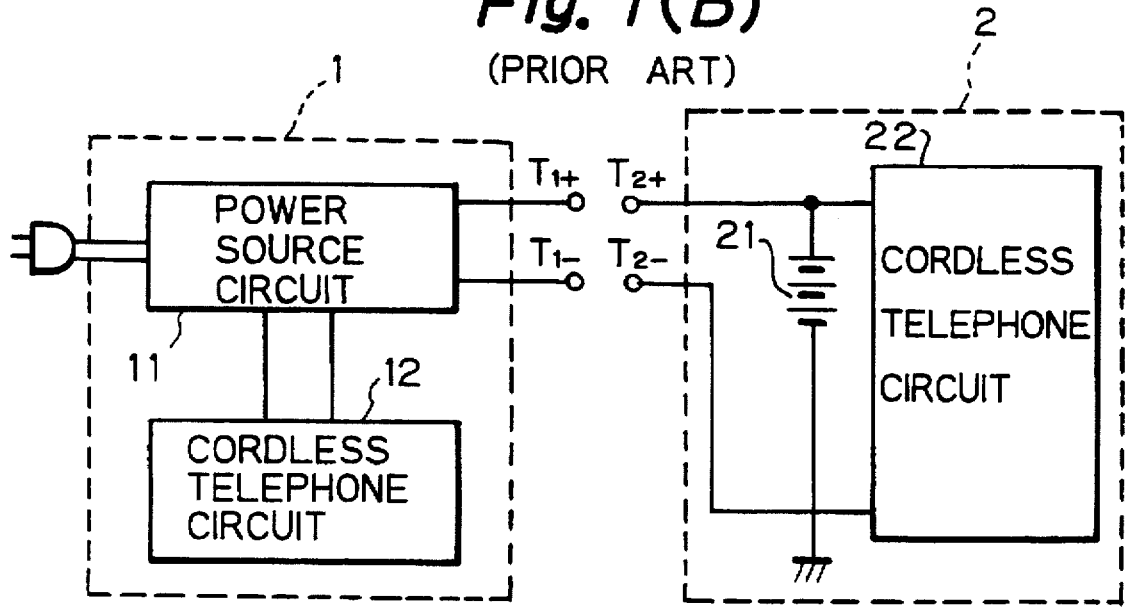
FIG. 1(B) is a block circuit diagram illustrating a prior cordless telephone which includes a power source circuit in a base unit and a secondary battery in a handset unit.
Figure 2:
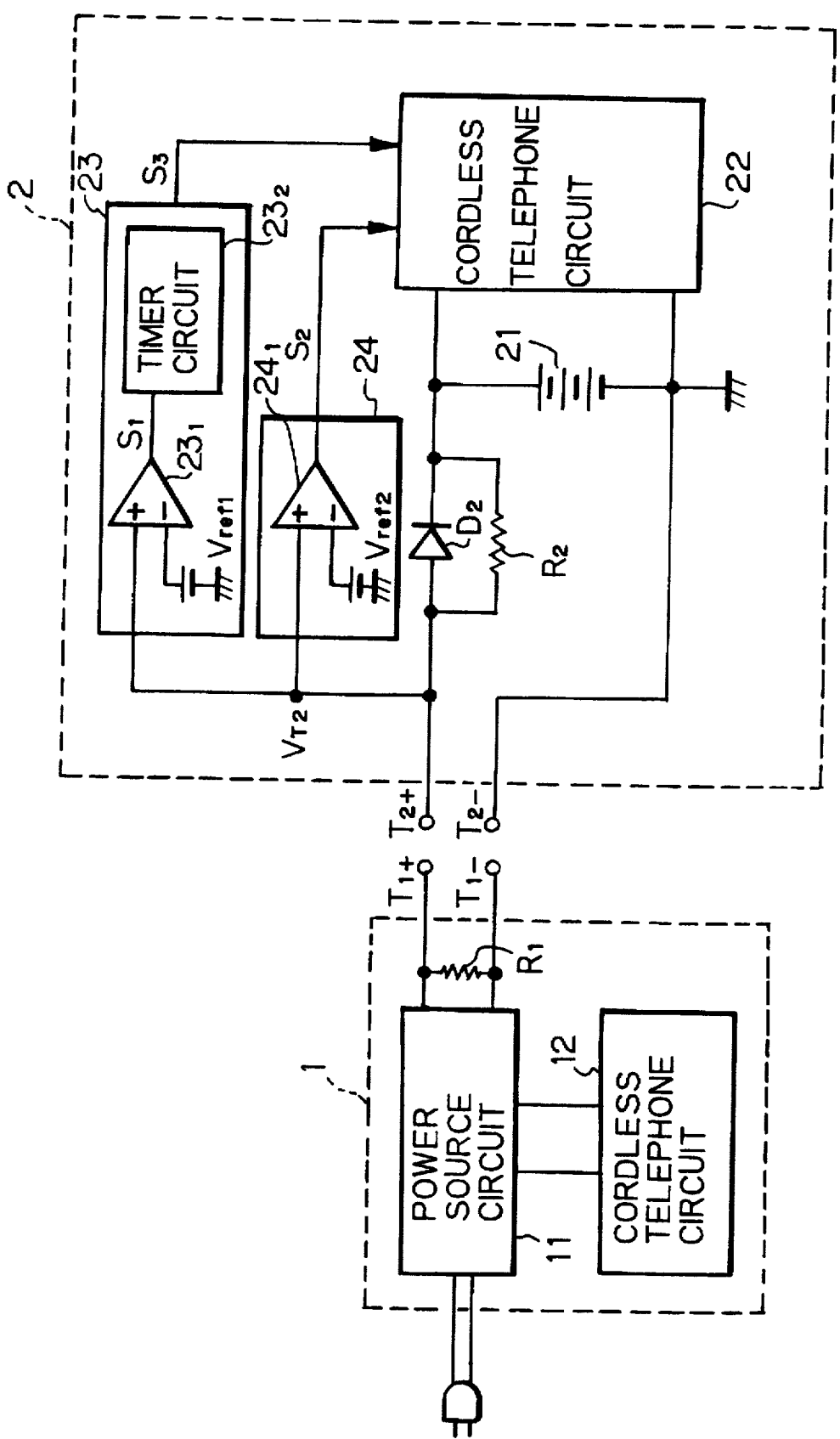
FIG. 2 is a block circuit diagram of a cordless telephone according to the present invention.

FIG. 2 illustrates a cordless telephone according to one embodiment of the present invention which is capable of detecting a break in power at a base unit. In FIG. 2, circuits similar to those of a prior art as shown in FIG. 1 are designated by identical numerals.

As shown in FIG. 2, the base unit 1 includes a resistor $R_1$ connected between a pair of the power output terminals $T_{1+}$ and $T_{1-}$ of the power source circuit 11, while the handset unit 2 includes a diode $D_2$ and a resistor $R_2$ connected in parallel and inserted between the charging terminal $T_{2+}$ which receives power supply from the power output terminal $T_{1+}$ and the positive terminal of the secondary battery 21.

The handset unit 2 further comprises a power break detection circuit 23 equipped with a voltage comparator $23_1$ and a digital timer circuit $23_2$ as well as a charging detection circuit 24. The non-inverted input terminal of the comparator $23_1$ is connected to the charging terminal $T_{2+}$ and the inverted input terminal thereof receives a first reference voltage $V_{ref1}$. The comparator $23_1$ monitors the voltage $V_{T2}$ at the charging terminal $T_{2+}$ to detect whether or not the voltage $V_{T2}$ is above the first reference voltage $V_{ref1}$, and outputs a logical signal $S_1$ to the timer circuit $23_2$. The first reference voltage $V_{ref1}$ is set to be somewhat larger than a voltage which has been obtained by dividing the maximum charged voltage $V_{21}$ of the secondary battery 21 by the resistors $R_1$ and $R_2$, or $V_{ref1} > V_{21} R_1/(R_1+R_2)$.

The timer circuit $23_3$ executes a counting operation or clocking operation only when the logical signal $S_1$ from the comparator $23_1$ is at a low level (which represents $V_{T2} < V_{ref1}$), provides a power break detection signal $S_3$ indicating a break in power to the cordless telephone circuit 22 when the count value reaches a predetermined value, and is reset when the logical signal $S_1$ comes to a high level. Accordingly, the timer circuit 23 output the power break detection signal $S_3$ only when the timer circuit 23 continuously executes the counting operation for a predetermined time period $T_0$.

The charging detection circuit 24 comprises a voltage comparator $24_1$ the non-inverted input terminal of which is connected to the charging terminal $T_{2+}$ to receive the voltage $V_{T2}$ while the inverted input terminal of which receives a second reference voltage $V_{ref2}$. The second reference voltage $V_{ref2}$ is set to be higher than the first reference voltage $V_{ref1}$ but lower than the usual power output voltage from the power source circuit 11. The comparator $24_1$ supplies a logical signal $S_2$ having a high level when the voltage $V_{T2}$ at the charging terminal $T_{2+}$ exceeds the second reference voltage $V_{ref2}$ to the cordless telephone circuit 22.

Operation of the cordless telephone shown in FIG. 2 will next be explained. When the handset unit 2 is placed in the cradle of the base unit 1 and no break in power exists in the base unit, the power output terminals $T_{1+}$ and $T_{1-}$ respectively connected with the charging terminals $T_{2+}$ and $T_{2-}$, and thus the electric current flows from the power source circuit 11 of the base unit 1 to the secondary battery 21 via the diode $D_2$ whereby the secondary battery 21 is charged. The electric power charged in the secondary battery 21 is supplied to the cordless telephone circuit 22 and the handset unit is active in executing the normal intermittent reception operation or the like. At this time, the voltage $V_{T2}$ at the charging terminal $T_{2+}$ is equivalent to the power output voltage from the power source circuit 11.

Under such a condition as described above, if a break in power occurs due to turning-off of the main power source switch or the like, the power source circuit 11 will not supply any power and thus a current will flow from the positive terminal of the secondary battery 21 through the resistor $R_2$, terminals $T_{2+}$ and $T_{1+}$, the resistor $R_1$, and the terminals $T_{1-}$ and $T_{2-}$ to the negative terminal or ground terminal of the second battery 21. It is to be noted that, at this time, the diode $D_2$ is inversely biased, and thus the current flows through only the resistor $R_2$.

Accordingly, the voltage at the secondary battery 21 will be divided by the resistors $R_2$ and $R_1$, and hence the voltage $V_{T2}$ at the charging terminal $T_{2+}$ will drop below $V_{21} R_1/(R_1+R_2)$ which is lower than the first reference voltage $V_{ref1}$. Therefore, the logical signal $S_1$ from the comparator $23_1$ will change to a low level. This will cause the timer circuit $23_2$ to activate and commence a clocking operation. If the timer circuit $23_2$ continuously clocks for the time period $T_0$, the power break detection signal $S_3$ representing an occurrence of a break in power at the base unit 1 will be supplied to the cordless telephone circuit 22.

This will cause the cordless telephone circuit 22 to enter a sleep mode which is an operational mode enabling power consumption to be greatly reduced. It is to be noted that the resistors $R_1$ and $R_2$ are set to have sufficiently large resistance values to make the discharging current flowing through these resistors extremely small, and power consumption from the secondary battery 21 taken by these resistors is negligible.

Figure 3:
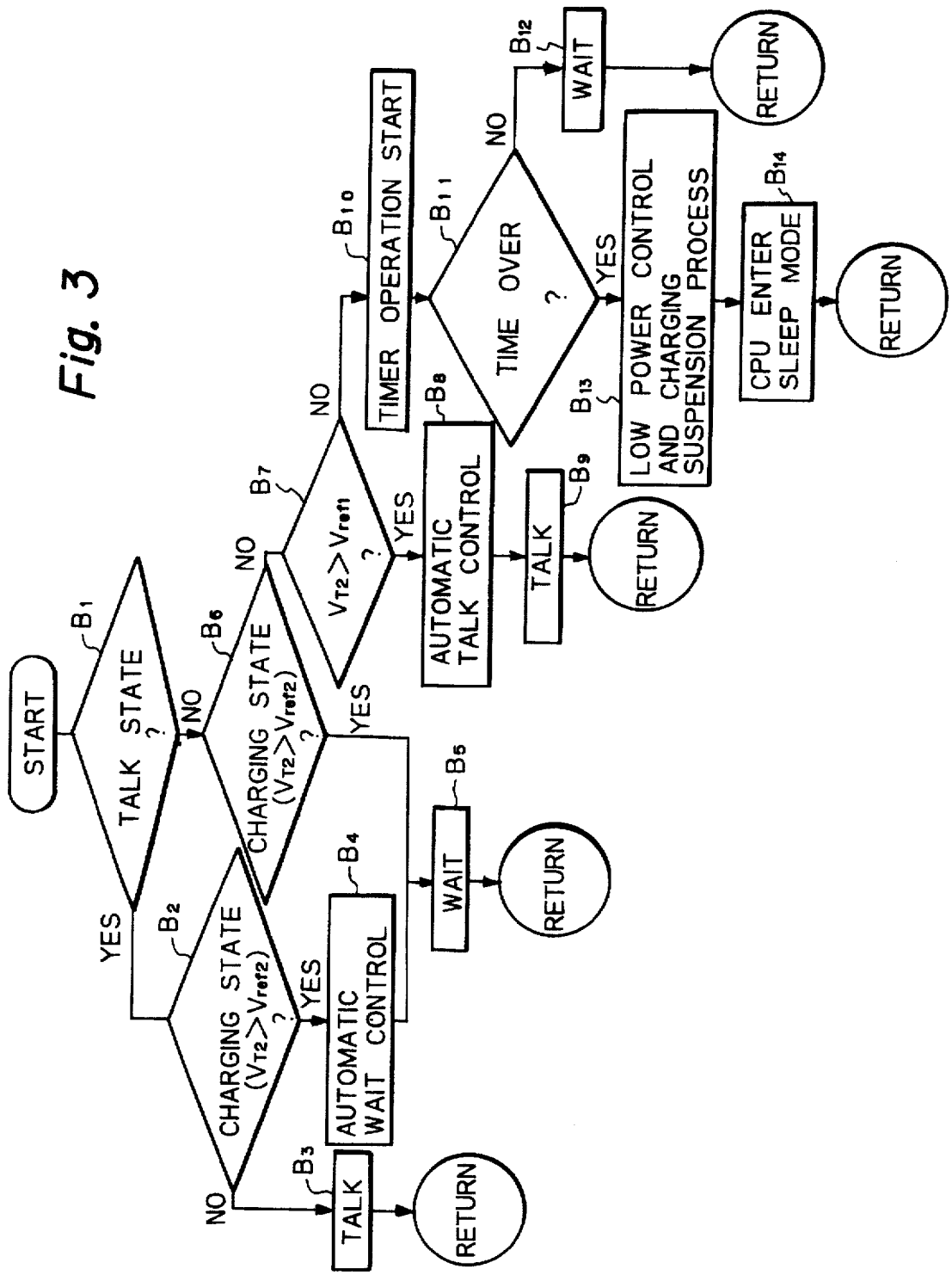
FIG. 3 is a flowchart for explaining an operation of the cordless telephone shown in FIG. 2.

The power break detection operation of the cordless telephone shown in FIG. 2 is explained in more detail by referring to a flow chart shown in FIG. 3. It is to be noted that the process flow shown in FIG. 3 is executed under a control by a microprocessor (CPU; not shown) incorporated in the cordless telephone circuit 22 of the handset unit 2.

Firstly, at a block $B_1$, detection is made as to whether the telephone set is in a talk state. If so, the process proceeds to a block $B_2$ where detection is made as to whether the secondary battery 21 of the handset unit 1 is being charged. At the block $B_2$, the level of the logical signal $S_2$ from the charge detection circuit 24 is monitored and when it is detected that the level of the signal is high, that means $V_{T2} \geq V_{ref2}$, it is judged to be affirmative or "YES". Otherwise, it is judged to be negative or "NO", which means that the secondary battery is not charged and that the talk state is continued. Accordingly, the process returns through a block $B_3$ to the block $B_1$.

If it is decided at the block $B_2$ that the secondary battery 21 is charged, it is meant that the talk state no longer exists and the handset unit has been replaced in the cradle of the base unit 1, an automatic wait control operation is implemented at a block $B_4$ and a talk wait condition or talk ready condition is prevailing in the block $B_5$. Then the process flow returns to the block $B_1$.

If no talk state is detected in the block $B_1$ and the charge condition is detected in a block $B_6$ at which the same decision prosecution is practiced, the process returns to the block $B_1$ through the block $B_5$.

In the block $B_6$, if a no-charge condition is detected, a decision as to whether or not a break in power has occurred is next made. In a block $B_7$, the voltage $V_{T2}$ at the charging terminal $T_{2+}$ of the handset unit 2 is detected to be above the first reference voltage $V_{ref1}$ or not. This decision is made according to the level of the logical signal $S_1$ from the comparator $23_1$ of the power break detection circuit 23. Namely, if the logical signal $S_1$ is at a high level representing $V_{T2} \geq V_{ref1}$, it is judged that there is no break in power but that the handset unit is picked up by the user. Therefore, the process goes to a block $B_8$ where an automatic talk control operation is executed and then returns through a block $B_9$ to the block $B_1$.

If it is decided in the block $B_7$ that $V_{T2}<V_{ref1}$, this means that the voltage $V_{T2}$ of the secondary battery 21 is at or below the value $V_2 R_2/(R_1+R_2)$ which has been obtained by dividing the maximum voltage $V_2$ of the secondary battery 21 with the resistance $R_1$ and $R_2$, and the logical signal $S_1$ is at the low level. As a consequence, the timer circuit $23_2$ is activated in a block $B_{10}$ and it is decided at the block $B_{11}$ whether the time period $T_0$ has elapsed or not. If the voltage $V_{T2}$ at the charging terminal $T_{2+}$ exceeds $V_{ref1}$ before the time period $T_0$ has passed, this means that the charging terminals $T_{2+}$ and $T_{2-}$ have been temporarily shorted due to an accident or that a power failure has occurred and that the process need not enter the sleep mode. Accordingly, the telephone is ready for use in the block $B_{12}$ and the process returns to the block $B_1$.

In the block $B_{11}$, when it is detected that the timer circuit $23_2$ is timed out or the condition that the voltage $V_{T2}$ at the charging terminal $T_{2+}$ is lower than the first reference voltage $V_{ref1}$ has continued longer than the time period $T_0$, it is decided that a break in power has occurred, so the process proceeds to a block $B_{13}$ where a low power control and charging suspension process are executed. Then in a block $B_{14}$, the CPU enters the sleep mode.

Operations in the blocks $B_{13}$ and $B_{14}$ will be executed as follows.

The low power control at the block $B_{13}$ is executed by turning-off power sources for devices such as a reception circuit, a transmission circuit and the like in the handset unit, excluding the CPU. The CPU will enter into a sleep mode in the block $B_{14}$, so that, for example, input/output condition and an output level at input/output (I/O) ports of the CPU will be set to be operable by a low power, operations of circuits in the CPU such as an A/D converter or the like will be stopped, and the processing speed of the CPU will be lowered.

The charging interruption processing operation in the block $B_{13}$ will be executed by setting the interruption so that the CPU may commence to operate upon an operation commencement event occurring at the commencement of charging, by allowing the interruption of the operation commencement event and by preventing any unnecessary interruptions.

According to the embodiment described above, although it is so constituted that a break in power can be detected by monitoring the voltage $V_{T2}$ at the charging terminal $T_{2+}$ of the handset unit 2. Instead of monitoring the level of the voltage $V_{T2}$, it is also possible to constituted the invention such that a means for detecting a direction of a current flowing direction between the charging terminal $T_{2+}$ and the positive terminal of the secondary battery 21 is provided, and occurrence of a break in power is decided when the current has flowed in the direction from the secondary battery 21 to the charging terminal $T_{2+}$. Furthermore, with regard to detection of the charging condition, it may be so designed that the logical signal $S_2$ representing the charging condition is provided to the cordless telephone circuit 22 (or the CPU therein) only when the current flows in the direction from the terminal $T_{2+}$ to the secondary battery 21.

It is to be noted in the embodiment described above that although the timer circuit $23_2$ has been provided in anticipation of a temporary short between the charging terminals $T_{2+}$ and $T_{2-}$ as well as a temporary break in power at the power source circuit 12, it is not necessary to provide a timer circuit when unexpected break in power are considered to be unlikely to occur.

The present invention is also adaptable for detecting a power failure in electronic apparatus using secondary batteries, and thus it is not limited to application in a cordless telephone.

Since the present invention is constituted as above described, a break in power of the power source circuit in the base unit can be detected by a simple constitution, and when the power failure is detected, the handset unit enters a sleep mode so that consumption of power charged in the secondary battery incorporated in the handset unit is reduced. Therefore, the telephone can be readily used in an office on a day following holidays.

In a prior cordless telephone which is automatically set to a talk mode when a handset unit is lifted from a cradle of a base unit, a break in power may be recognized as an un-hooking of the handset unit. However, according to the present invention, since a break in power can be clearly distinguished from such a state, erroneous operation may be prevented.

Having described specific embodiments of the present invention, it is believed obvious that modification and variation of the invention is possible in light of the above teachings.

What is claimed is:

1. A cordless telephone consisting of a base unit incorporating a power source circuit and a handset unit incorporating a secondary battery which is charged by said power source circuit when said handset unit is placed in a cradle of said base unit, said cordless telephone comprising;

a resistor means connected between a pair of power output terminals of said power source circuit of said handset unit;

a circuit incorporated in said handset unit and connected between a charging terminal which receives power supply output from said power source circuit and a terminal of said secondary battery, said circuit comprising a rectifier element and a resistor means connected in parallel to each other;

a power break detection circuit incorporated in said handset unit, comprising a first voltage comparator for comparing a voltage at said charging terminal with a first reference voltage, and said power break detection circuit providing a power break detection signal when the former voltage is lower than the latter voltage; and a control circuit for controlling said handset unit to enter a sleep mode, in response to said power break detection signal from said power break detection circuit.

2. A cordless telephone as claimed in claim 1, wherein said power break detection circuit further includes a timer circuit connected to receive the output of said voltage comparator, said timer circuit clocking during when said voltage at said charging terminal is lower than said first reference voltage, and providing a time-over signal as said power break detection signal when it continuously clocks for a predetermined time period.

3. A cordless telephone set as claimed in claim 1, wherein said handset unit further includes a second voltage comparator for comparing said voltage at said charging terminal with a second reference voltage which is larger than said first reference voltage, and for providing a signal to said control circuit when the former voltage is lower than the latter voltage, whereby said signal from said second comparator representing that said secondary battery is not being charged by said power source circuit of said base unit.

4. A cordless telephone set as claimed in claim 2, wherein said handset unit further includes a second voltage comparator for comparing said voltage at said charging terminal with a second reference voltage which is larger than said first reference voltage, and for providing a signal to said control circuit when the former voltage is lower than the latter voltage, whereby said signal from said second comparator representing that said secondary battery is not being charged by said power source circuit of said base unit.

5. A cordless telephone consisting of a base unit incorporating a power source circuit and a handset unit incorporating a secondary battery which is charged by said power source circuit while said handset unit is placed on a cradle of said base unit, said cordless telephone comprising;

a resistor means connected between a pair of power output terminals of said power source circuit of said handset unit;

a circuit incorporated in said handset unit and connected between a charging terminal which receives a power supply output from said power source circuit and a terminal of said secondary battery, said circuit comprising a rectifier element and a resistor means connected in parallel to each other;

a power break detection circuit incorporated in said handset unit, comprising current direction detection means for detecting a direction of current flowing between said charging terminal and said terminal of said secondary battery, said power failure detection circuit providing a power break detection signal when the current flows from said second battery to said charging terminal; and a control circuit for establishing a sleep mode in said handset unit, in response to said power break detection signal from said power failure detection circuit.

6. A cordless telephone as claimed in claim 5, wherein said power break detection circuit further comprises a timer circuit connected to receive the output of said current direction detection means, said timer circuit clocking during when the current flows from said second battery to said charging terminal, and providing a time-over signal as said power break detection signal when it continuously clocks for a predetermined time period.

7. A cordless telephone set as claimed in claim 5, wherein said handset unit further includes a voltage comparator for comparing a voltage at said charging terminal with a reference voltage, and for providing a signal to said control circuit when the former voltage is lower than the latter voltage, whereby said signal from said comparator representing that said secondary battery is not being charged by said power source circuit of said base unit.

8. A cordless telephone set as claimed in claim 6, wherein said handset unit further includes a voltage comparator for comparing a voltage at said charging terminal with a reference voltage, and for providing a signal to a control circuit when the former voltage is lower than the latter voltage, whereby said signal from said comparator representing that said secondary battery is not being charged by said power source circuit of said base unit.

* * * * *